(12) United States Patent
Hooli et al.

(10) Patent No.: US 12,335,076 B2
(45) Date of Patent: Jun. 17, 2025

(54) CELL EDGE SCHEDULING ARRANGEMENT FOR HIGH SUBCARRIER SPACING

(71) Applicant: Nokia Technologies Oy, Espoo (FI)

(72) Inventors: Kari Juhani Hooli, Oulu (FI); Esa Tiirola, Kempele (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 337 days.

(21) Appl. No.: 17/794,569

(22) PCT Filed: Jan. 19, 2021

(86) PCT No.: PCT/EP2021/050973
§ 371 (c)(1),
(2) Date: Jul. 21, 2022

(87) PCT Pub. No.: WO2021/156045
PCT Pub. Date: Aug. 12, 2021

(65) Prior Publication Data
US 2023/0129410 A1 Apr. 27, 2023

Related U.S. Application Data

(60) Provisional application No. 62/970,276, filed on Feb. 5, 2020.

(51) Int. Cl.
*H04L 27/26* (2006.01)

(52) U.S. Cl.
CPC .... *H04L 27/26025* (2021.01); *H04L 27/2605* (2013.01); *H04L 27/2634* (2013.01)

(58) Field of Classification Search
CPC ........... H04L 27/26025; H04L 27/2605; H04L 27/2634
See application file for complete search history.

(56) References Cited

U.S. PATENT DOCUMENTS

| 10,764,099 | B2 * | 9/2020 | Park ................. H04L 27/26025 |
| 2017/0325249 | A1 | 11/2017 | Lopez et al. |

(Continued)

FOREIGN PATENT DOCUMENTS

| CA | 2823574 A1 | 1/2012 |
| CN | 107566080 A | 1/2018 |

(Continued)

OTHER PUBLICATIONS

Office Action received for corresponding Chinese Patent Application No. 202180019256.5, dated Jul. 21, 2023, 6 pages of Office Action and 3 pages of summary and translation available.

(Continued)

*Primary Examiner* — Michael J Moore, Jr.
(74) *Attorney, Agent, or Firm* — Barta Jones, PLLC

(57) ABSTRACT

A method, apparatus, and a computer-readable storage medium are provided for cell-edge scheduling arrangement for high subcarrier spacing. In an example implementation, the method may include configuring, by a gNB, a first numerology parameter that enables at least symbol repetition and a modified cyclic prefix, and transmitting, by the gNB, a downlink signal/channel that is configured based at least on the symbol repetition and modified cyclic prefix. In another example implementation, the method may include configuring, by a user equipment (UE), a first numerology parameter that enables at least symbol repetition and modified cyclic prefix based at least on information received from a gNB, aligning, by the UE, fast Fourier transform (FFT)

(Continued)

windows with boundaries of the repeated symbols, and processing, by the UE, a downlink signal/channel received from the gNB based at least on the aligning.

16 Claims, 7 Drawing Sheets

(56) References Cited

U.S. PATENT DOCUMENTS

| | | | |
|---|---|---|---|
| 2018/0077710 A1* | 3/2018 | Ly | H04W 72/0453 |
| 2018/0091373 A1* | 3/2018 | Manolakos | H04L 41/0896 |
| 2019/0174513 A1* | 6/2019 | Loehr | H04W 72/1268 |
| 2019/0260551 A1 | 8/2019 | Baldemair et al. | |
| 2019/0306855 A1* | 10/2019 | Tiirola | H04L 27/26025 |
| 2019/0320337 A1* | 10/2019 | Siomina | H04W 24/10 |
| 2019/0364520 A1* | 11/2019 | Kazmi | H04W 56/00 |
| 2020/0092065 A1* | 3/2020 | Kuang | H04L 27/2666 |
| 2020/0128585 A1* | 4/2020 | Kuang | H04W 8/22 |
| 2020/0374067 A1* | 11/2020 | Vieira | H04L 27/261 |
| 2021/0112552 A1* | 4/2021 | Tiirola | H04L 5/0064 |
| 2021/0211343 A1* | 7/2021 | Baldemair | H04W 72/1263 |
| 2022/0190892 A1* | 6/2022 | Park | H04L 27/26 |
| 2023/0129410 A1* | 4/2023 | Hooli | H04L 27/2605 370/329 |

FOREIGN PATENT DOCUMENTS

| | | | |
|---|---|---|---|
| CN | 107567097 A | 1/2018 | |
| CN | 109155718 A | 1/2019 | |
| CN | 109716847 A | 5/2019 | |
| CN | 109937602 A | 6/2019 | |
| CN | 110024343 A | 7/2019 | |
| CN | 110431813 A | 11/2019 | |
| EP | 3416327 A1 * | 12/2018 | H04L 27/2602 |
| JP | 2018-509844 A | 4/2018 | |
| WO | 2016/146165 A1 | 9/2016 | |
| WO | 2017/074246 A1 | 5/2017 | |
| WO | 2017/192081 A1 | 11/2017 | |
| WO | WO-2018141924 A1 * | 8/2018 | H04B 17/336 |
| WO | 2018/174760 A1 | 9/2018 | |
| WO | 2021/047749 A1 | 3/2021 | |
| WO | 2021/099008 A1 | 5/2021 | |

OTHER PUBLICATIONS

Shuo et al., "Symbol timing estimation iterative algorithm in the LTE multiuser uplink", Journal of Xidian University, vol. 45, No. 1, Feb. 2018, pp. 48-54.

Office Action received for corresponding Indian Patent Application No. 202247049792, dated Jul. 21, 2023, 6 pages.

Office Action received for corresponding Japanese Patent Application No. 2022-547689, dated Nov. 7, 2023, 3 pages of Office Action and 4 pages of summary available.

Office action received for corresponding Vietnamese Patent Application No. 1-2022-05651, dated Sep. 28, 2022, 2 pages of office action and 1 page of translation available.

Notice of Allowance received for corresponding Chinese Patent Application No. 202180019256.5, dated Dec. 15, 2023, 4 pages of Allowance and no page of translation available.

Notice of Allowance received for corresponding European Patent Application No. 21701435.6, dated Apr. 17, 2024, 8 pages.

"3rd Generation Partnership Project; Technical Specification Group Radio Access Network; NR; Physical channels and modulation (Release 15)", 3GPP TS 38.211, V15.6.0, Jun. 2019, pp. 1-97.

"New SID on NR waveform beyond 52.6GHz", 3GPP TSG RAN Meeting #79, RP-180453, Agenda: 9.1.2, Qualcomm, Mar. 19-22, 2019, 4 pages.

"New SID: Study on NR design above 52.6GHz", 3GPP TSG RAN Meeting #79, RP-180320, Agenda: 9.1.2, Intel Corporation, Mar. 19-22, 2018, 4 pages.

"3rd Generation Partnership Project; Technical Specification Group Radio Access Network; NR; Physical layer procedures for control (Release 15)", 3GPP TS 38.213, V15.2.0, Jun. 2018, pp. 1-99.

International Search Report and Written Opinion received for corresponding Patent Cooperation Treaty Application No. PCT/EP2021/050973, dated May 20, 2021, 13 pages.

Office Action received for corresponding Japanese Patent Application No. 2022-547689, dated Jun. 4, 2024, 1 page of Office Action and 1 pages of summary available.

Office action received for corresponding Vietnamese Patent Application No. 1-2022-05651, dated Sep. 5, 2024, 2 pages of office action and no page of translation available.

* cited by examiner

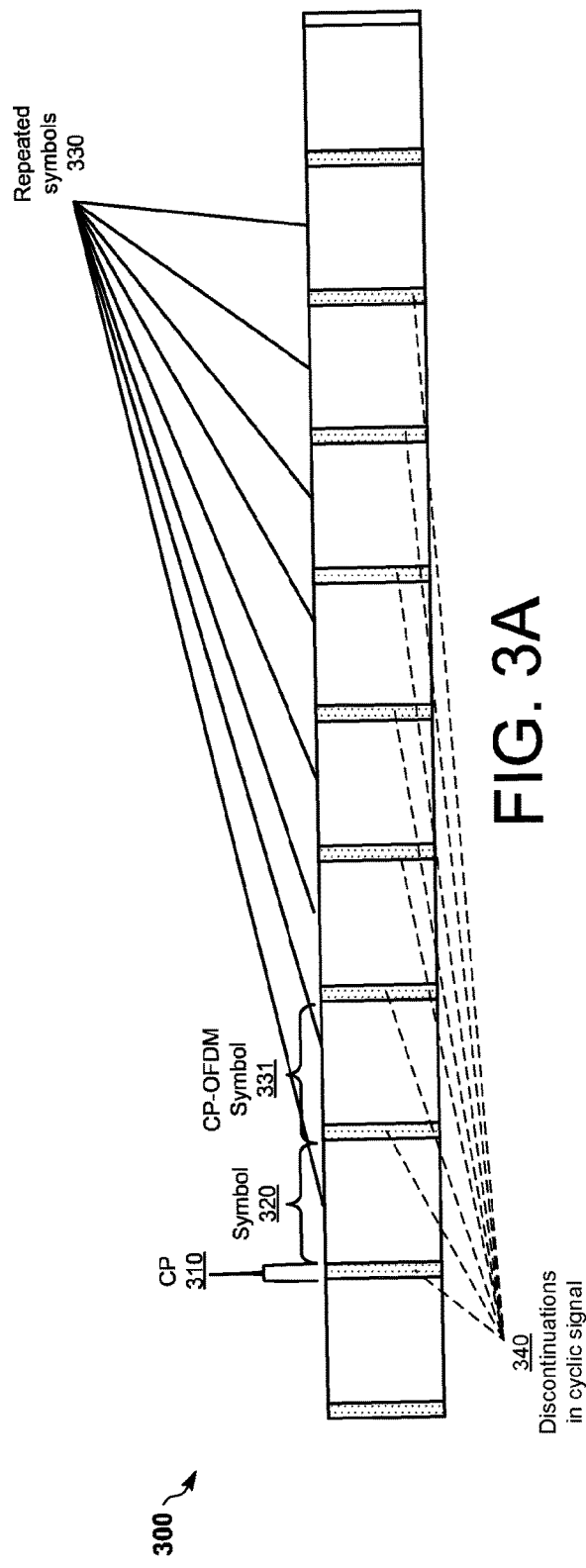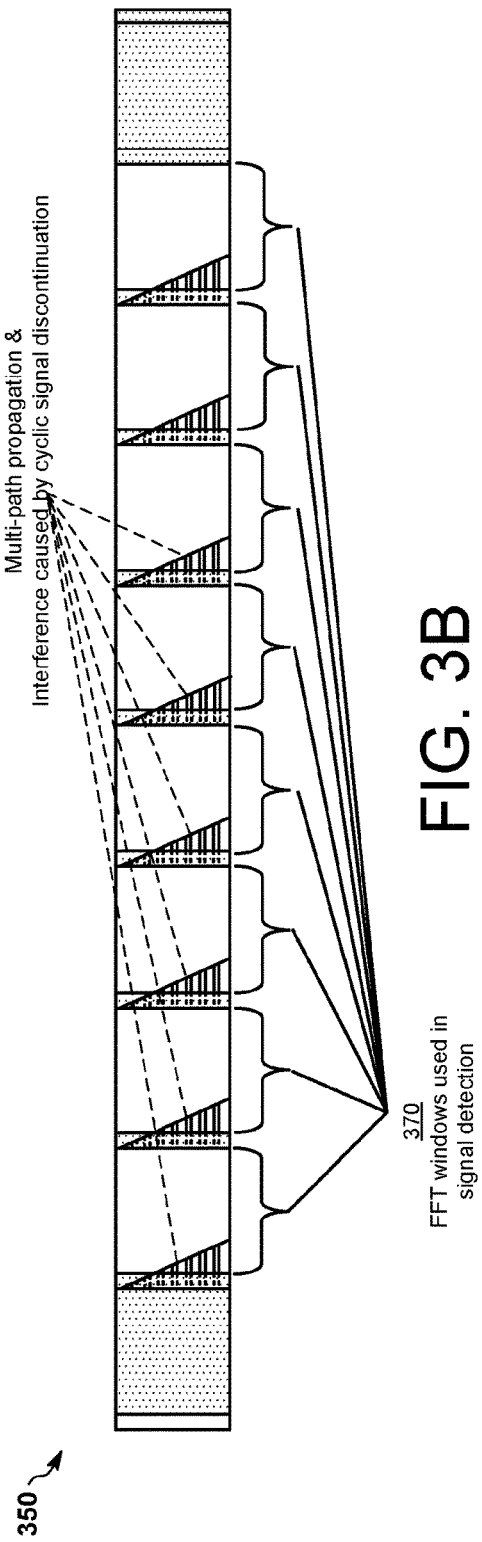

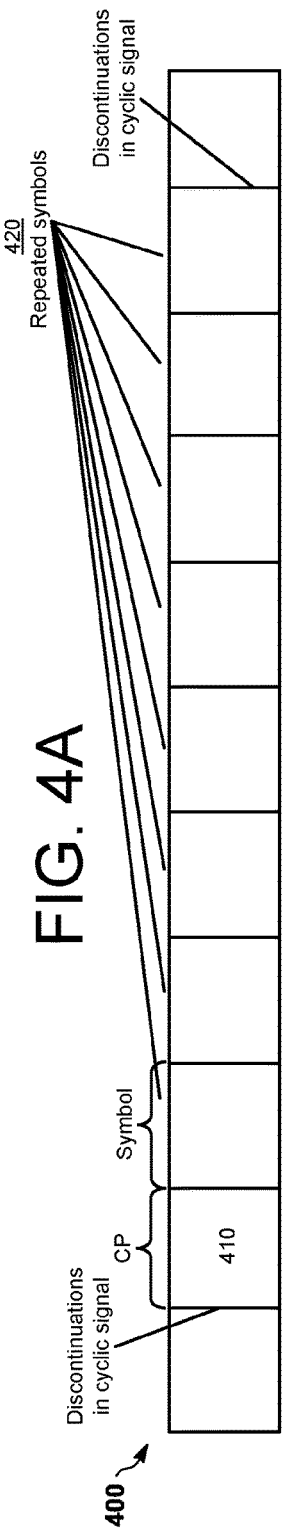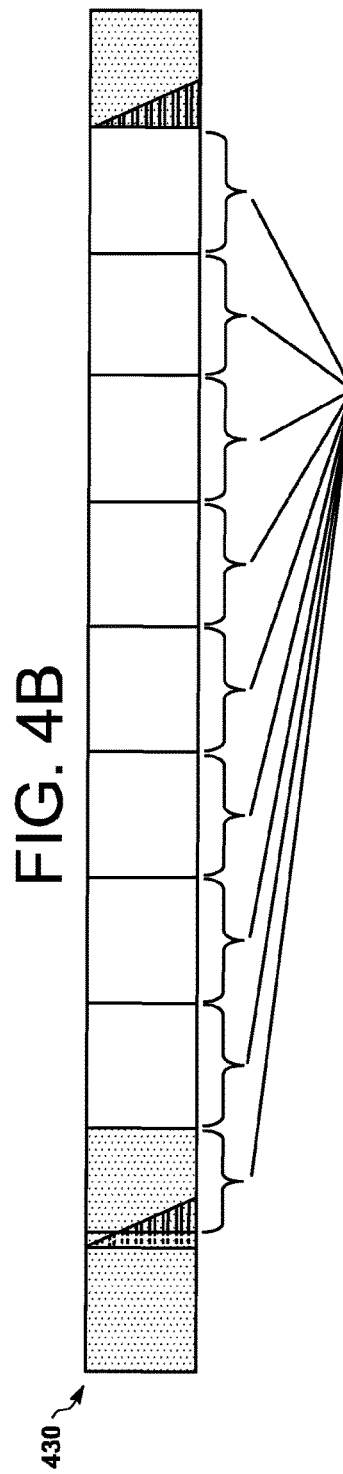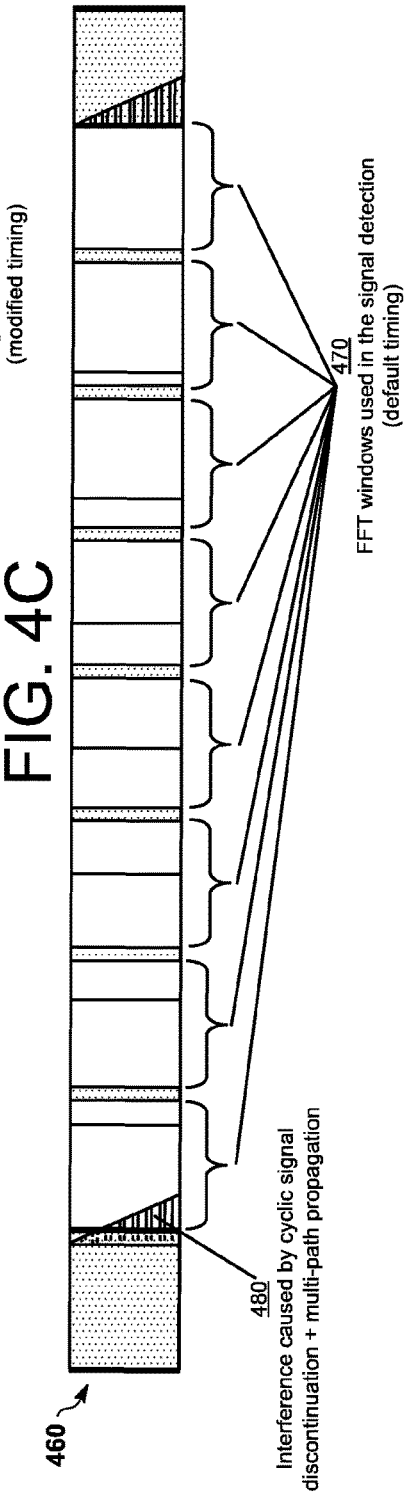

CELL EDGE SCHEDULING ARRANGEMENT FOR HIGH SUBCARRIER SPACING

RELATED APPLICATION

This application was originally filed as PCT Application No. PCT/EP2021/050973 on Jan. 19, 2021, which claims priority to U.S. Provisional Application No. 62/970,276, filed on Feb. 5, 2020, each of which is incorporated herein by reference in its entirety.

TECHNICAL FIELD

This description relates to wireless communications, and in particular, to scheduling in wireless communication networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for cell-edge scheduling for high subcarrier spacing configurations.

In an example implementation, the method may include configuring, by a gNB, a first numerology parameter that enables at least symbol repetition and a modified cyclic prefix, and transmitting, by the gNB, a downlink signal/channel that is configured based at least on the symbol repetition and modified cyclic prefix.

In another example implementation, the method may include configuring, by a user equipment (UE), a first numerology parameter that enables at least symbol repetition and modified cyclic prefix based at least on information received from a gNB, aligning, by the UE, fast Fourier transform (FFT) windows with boundaries of the repeated symbols, and processing, by the UE, a downlink signal/channel received from the gNB based at least on the aligning.

In another example implementation, the method may include receiving, by a user equipment (UE), a first numerology parameter that enables at least symbol repetition and a modified cyclic prefix; and transmitting, by the UE, an uplink signal/channel based at least on the symbol repetition and modified cyclic prefix.

In another example implementation, the method may include configuring, by a gNB, a first numerology parameter that enables at least symbol repetition and a modified cyclic prefix, aligning, by the gNB, fast Fourier transform (FFT) windows with boundaries of the repeated symbols, and processing, by the gNB, an uplink signal/channel received from a user equipment (UE) based at least on the aligning.

BRIEF DESCRIPTION OF THE DRAWINGS

FIG. 3A is a block diagram illustrating repeated CP-OFDM symbols, according to an example implementation.

FIG. 3B is a block diagram illustrating signal interference during signal detection, according to an example implementation.

FIG. 4A is a block diagram illustrating transmission of a signal based at least on repeated symbols and a longer (modified) cyclic prefix, according to an example implementation.

FIG. 4B is a block diagram illustrating receiving of a signal that is transmitted based at least on repeated symbols and a longer (modified) cyclic prefix, according to an example implementation.

FIG. 4C is a block diagram illustrating FFT window timing and cyclic discontinuations on proposed repetition of CP-OFDM symbol, according to an additional example implementation.

DETAILED DESCRIPTION

Figure 1:
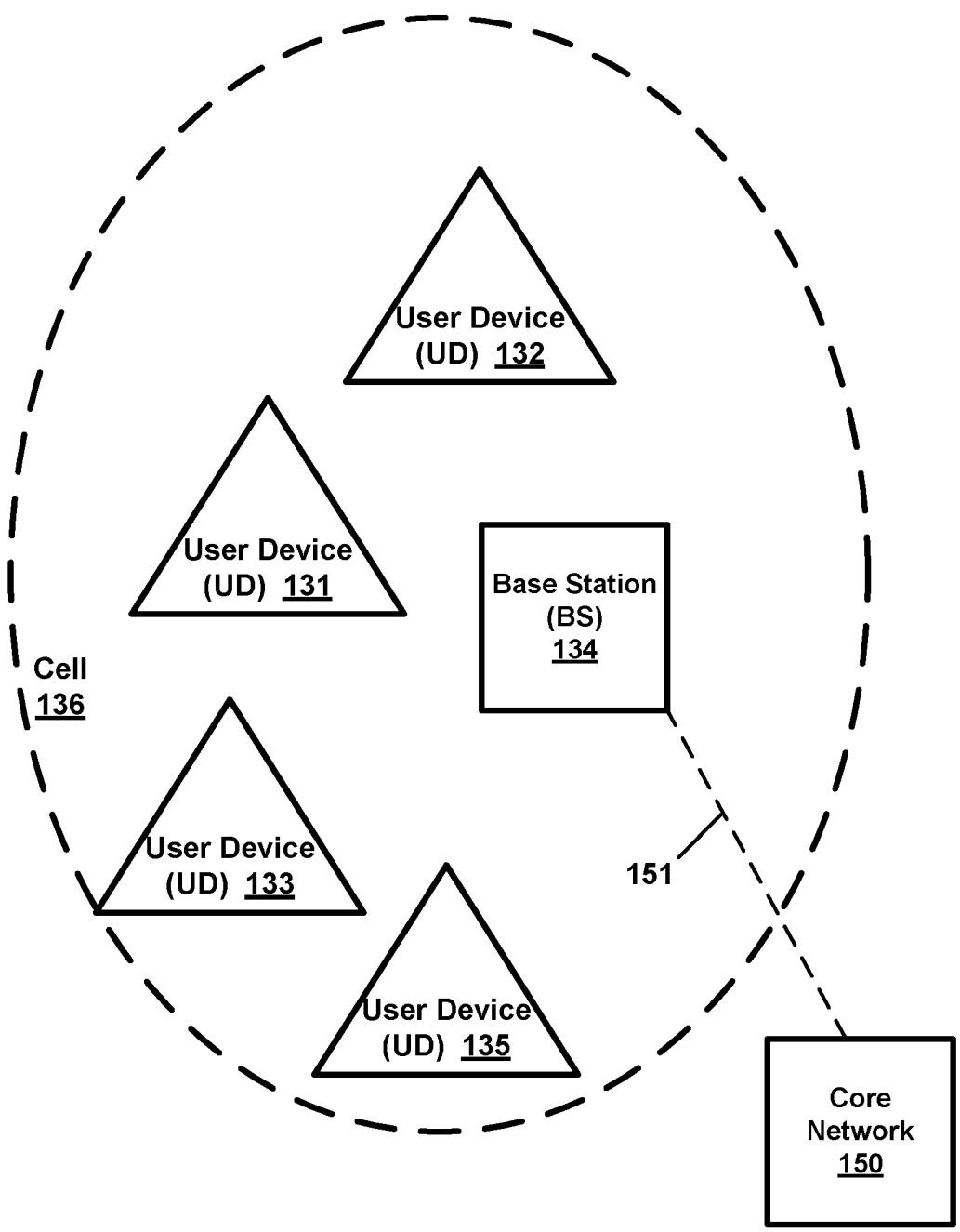
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used. In another example implementation, network 130 may support relay scenarios, e.g., in-band and out-band relaying. In-band relaying may be supported by an integrated access and backhaul (IAB) node and base station/gNB functionality may be supported out by a distributed unit (DU) of the IAB node. The UE functionality may be carried out by mobile termination (MT) part of the IAB node. The relay implementation may be used for backhaul deployment when optical or dedicated wireless backhaul is unavailable or inconvenient. Such backhaul implementation may take advantage from NR IAB node, for example, commercial deployments of backhaul applications using mmWave bands above 52.6 GHz, where some nodes may serve both backhaul and access.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 (e.g., five 9s) reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

Many modern wireless networks are based on multi-carrier transmissions where a signal is distributed to a set of sub-carriers comprised in the same symbol that is transmitted from a transmitter to a receiver. An example implementation of a multi-carrier transmission is orthogonal frequency division multiplexing (OFDM) which is used in, e.g., LTE, NR, etc. Frequency domain processing involving sub-carriers can also be used for some technologies considered as single-carrier transmission, e.g., discrete Fourier transform-spread OFDM (DFT-S-OFDM). Sub-carriers in frequency domain are spaced from each other. 3GPP specifications for 5G/NR define transmission numerologies that further define different resource spaces in terms of subcarrier spacings. Table 1 below illustrates some transmission numerologies, µ, supported by 5G/NR.

TABLE 1

| µ | $\Delta f = 2^\mu \cdot 15$ [kHz] |
|---|---|
| 0 | 15 |
| 1 | 30 |
| 2 | 60 |
| 3 | 120 |

Transmission numerology, µ, is a scaling factor that defines the scaling for different numerologies. Higher numerologies with higher scaling factors are assigned to higher operating frequencies. For a given fast Fourier transform (FFT) size, the subcarrier spacing also defines the maximum bandwidth of bandwidth part (BWP) and/or carrier. The transmission numerology (also referred to as a transmission numerology parameter) may be configured by a gNB and signaled to a UE, for example, via system information, system information on a broadcast channel, or radio resource signaling (RRC) configuring a BWP or carrier.

Figure 2:
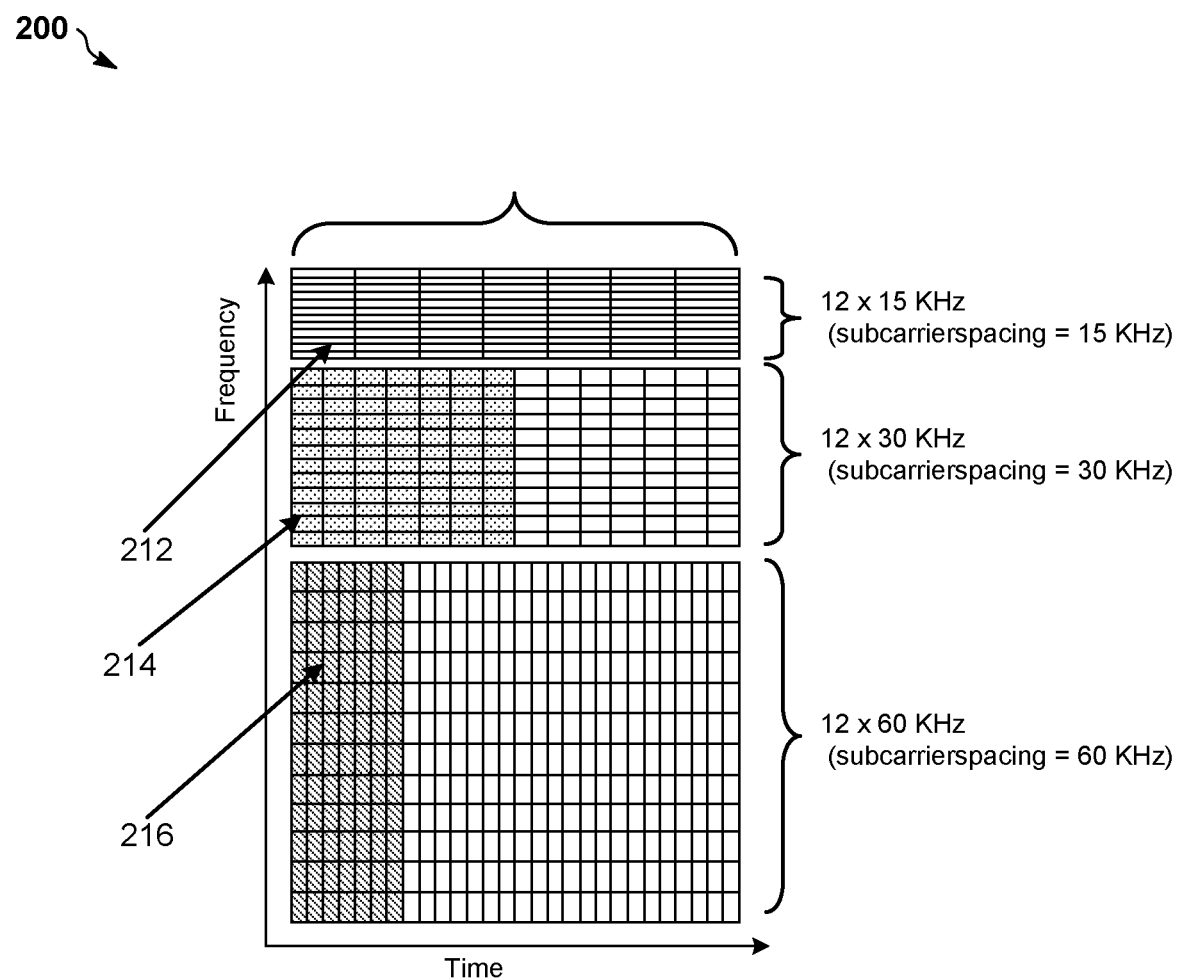
FIG. 2 is a chart illustrating time-frequency scaling, according to an example implementation.

However, larger sub-carrier spacings (e.g., higher scaling factors) may shorten the symbol duration, for example, as shown by 212, 214, and 216 of FIG. 2 for subcarrier spacings 15 KHz, 30 KHz, and 60 KHz, respectively, and may improve tolerance to phase noise when employing higher carrier bandwidths. When the operating frequency band increases, the phase noise also increases which requires increasing the sub-carrier spacing, determined, for example, by scaling factors. This may further reduce the symbol duration. But the scheduling procedures are based on a certain time interval between a scheduling command and the scheduled resource, and the time interval may be counted in symbols or time slots. With the reduced symbol duration, the time interval may reduce to such a degree that the receiver of the scheduling command has no time to receive and process the scheduling command before the scheduled resource occurs. Similarly, feedback procedures such as hybrid automatic repeat request (HARQ) procedures may be based on a certain time interval between a scheduled resource and the feedback and the time interval counted in symbols or time slots. With reduced symbol duration, the time interval may be reduced to such a degree that the receiver of the scheduled resource has no time to receive and process the scheduled resource before the feedback is due. Reduced symbol duration results in reduced received signal energy when transmission power remains constant. This may result in scheduling and coverage problems.

NR Rel-15 supports BWP size of 275 PRBs. This means that the maximum BWP size according to NR Rel-15 is 396 MHz (0.12 MHz*12*275). This is not enough for scenarios above 52.6 GHz where channel bandwidth can be as high as 10 GHz. In addition, phase noise increases. Therefore, larger subcarrier spacings are needed to manage phase noise and provide larger carrier bandwidths with reasonable FFT sizes. This can be achieved by extending numerology scaling framework defined in NR Rel-15 to support additional values, for example, $2^\mu$ scaling of subcarrier spacing, IFFT/FFT block length of $2^\mu$, and/or clock rate of $2^\mu$ elated to LTE, as shown in Table 2. For example, numerologies with scaling factors from 4 to 7 (as shown in Table 2) and scaling factor 8 may be suitable for operating frequencies above 52.6 Gigahertz (GHz) while the lower numerologies may be suitable for operating frequencies below the 52.6 GHz. This is merely one example. However, time-frequency scaling may also involve significant drawbacks for the following reasons.

TABLE 2

| | µ | Sub-carrier spacing [kHz] | Max BW with 4k FFT [MHz] | Slot length [µs] | Symbol length w/o CP [µs] | Nominal CP Length [ns] |
|---|---|---|---|---|---|---|
| FR1 | 0 | 15 | 50 | 1000 | 66.67 | 4688 |
| FR1 | 1 | 30 | 100 | 500 | 33.33 | 2343 |
| FR2 | 2 | 60 | 200 | 250 | 16.67 | 1172 |
| FR2 | 3 | 120 | 400 | 125 | 8.33 | 586 |
| >52.6 GHz | 4 | 240 | 800 | 62.5 | 4.17 | 293 |
| >52.6 GHz | 5 | 480 | 1600 | 31.25 | 2.08 | 147 |
| >52.6 GHz | 6 | 960 | 3200 | 15.625 | 1.04 | 73 |
| >52.6 GHz | 7 | 1920 | 6400 | 7.8125 | 0.52 | 37 |

For example, link budget may reduce by ~3 dB when subcarrier spacing doubles because the symbol and slot duration scale down when subcarrier spacing increases (e.g., as shown along x-axis of FIG. 2) and the related columns of Table 2. At the same time, the achievable Tx power does not increase when the subcarrier spacing is increased.

In other words, the power spectral density reduces with increasing subcarrier spacing. In some deployment scenarios, there may be a desire to reuse the same sites for mmWave radios operating on different frequency bands, the link budget difference between subcarrier spacings of 120 KHz (e.g., a candidate subcarrier spacing for FR2) and 960

KHz (e.g., a candidate subcarrier spacing for above 52.6 GHz) which may be ~9 dB (e.g., $10*\log_{10}(960/120)$) may be compensated for by repeated transmission of a same transport block or symbol. In addition, as shown in Table 2, time-frequency scaling also reduces the length of cyclic prefix (CP). For example, for subcarrier spacing of 960 KHz, the cyclic prefix duration may be ~70 ns which corresponds to a difference of ~21 m in propagation paths. Such short cyclic prefixes can easily become a bottleneck when relatively long transmission distances are supported with high subcarrier spacing. This may apply to at least some signals, e.g., signals that are transmitted with a wide(er) beam width (than some other channels). Such signals may include, for example, synchronization signals, control channels, broadcast channels, etc. This may also apply when the same signal is jointly transmitted from multiple transmit antenna locations There is also a need to consider NR UE processing times, e.g., PDSCH processing time prior to sending an ACK, PUSCH preparation after receiving UL grant, etc. Generally, they would scale down with increasing subcarrier spacing. However, such scaling down may occur at a slower rate which may indicate that UE (or gNB) processing capabilities do not increase linearly with increased bandwidth/subcarrier spacing, for example, as defined in Table 5.3-1 and Table 6.4-1 of 3GPPTS 38.213. Therefore, there is a need to revisit scheduling principles, for example, UL/DL ratio may be limited due to excessive PUSCH scheduling delays.

In order to achieve continuous reception in DL with 960 KHz subcarrier spacing, UE has to receive PDCCH once in each slot (e.g., 15.6 μs for 960 KHz subcarrier spacing). This becomes too complex when using high subcarrier spacings and may consume too much power. For example, based on NR Rel-15, PDCCH monitoring capability may reduce quite significantly with increased subcarrier spacing as defined in table 10.1-2 of 3GPP TS 38.213 v.15.2.0. Further decrease may be expected for higher subcarrier spacings for frequencies >52.6 GHz. Additionally, the duration of cyclic prefixes should be long enough to accommodate the expected channel delay spread even when same symbol is repeated in consecutive cyclic prefix-orthogonal frequency division multiplexing (CP-OFDM) symbols.

FIG. 3A is a block diagram 300 illustrating repeated CP-OFDM symbols, according to an example implementation. As illustrated in FIG. 3A, a symbol (e.g., symbol 320) may be repeated in consecutive CP-OFDM symbols (e.g., 331) without any modifications to the duration of cyclic prefix 310. Although the same symbol is repeated, the signal is not cyclic as there are discontinuations at the beginning of the cyclic prefix as shown at 340.

FIG. 3B is a block diagram 350 illustrating signal interference during signal detection, according to an example implementation. In some implementations, for example, if the channel delay spread is longer than the following cyclic prefix, the discontinuity with multi-path propagation may leak to FFT windows (e.g., 370) and may cause interference in signal detection as shown by 360, which are not desirable.

Thus, there is a desire/need for time-frequency scaling to support wider bandwidths with reasonable FFT sizes and to mitigate the impact of increased phase noise. However, straightforward scaling of time-frequency numerologies may lead to degraded link budget, cell edge performance issues, insufficient CP length, overwhelming PDCCH monitoring rate, and/or scheduling limitations due to UE and/or gNB processing times.

The present disclosure describes example methods which may include a method for cell edge arrangements (e.g., configurations) for high subcarrier spacings. In an example implementation, the method may include configuring, by a gNB, a time numerology parameter (also can be referred to the first numerology parameter) that enables at least symbol repetition and a modified cyclic prefix and transmitting, by the gNB, a downlink signal/channel that is configured based at least on the symbol repetition and modified cyclic prefix. In an additional example implementation, the method may include configuring, by a user equipment (UE), a time numerology parameter that enables at least symbol repetition and modified cyclic prefix based at least on information (e.g., time numerology parameter) received from a gNB, aligning, by the UE, fast Fourier transform (FFT) windows with boundaries of the repeated symbols, and processing, by the UE, a downlink signal/channel received from the gNB based at least on the aligning.

In some implementations, for example, a gNB or UE (e.g., 134 or 131 of FIG. 1) may determine frequency domain values of a signal or channel (e.g., PDCCH, PDSCH, PUCCH, PUSCH, etc.) based on a parameter, e.g., transmission numerology parameter (or subcarrier spacing). As described above, the frequency domain values may include subcarrier spacing, fast Fourier transform (FFT)/Inverse FFT (IFFT) time durations, sample rate, etc. In some implementations, other parameters related to the sample rate, e.g., timing advance, may be determined based on transmission numerology.

The gNB (or UE) may also determine parameters related to subframe and slot timing, for example, symbol timing and slot numbering, based on time numerology. In some implementations, for example, other parameters such as timing of assignment, e.g., starting symbol and duration of physical downlink shared channel (PDSCH)/physical uplink shared channel (PUSCH), slot timing of PDSCH/PUSCH, slot timing of physical uplink control channel (PUCCH), for example, parameters K0, K1, K2, PDCCH/PUCCH structure and corresponding resources, etc., may also be determined. In some implementations, cyclic prefix duration may also be determined based on time numerology, including, for example, a half-subframe first cyclic prefix every $7*2^{(\mu_t)}$ symbol. The half-subframe first CP may appear every 0.5 ms, and part of the first symbol of each subframe (1 ms). For example, the normal cyclic prefix may be provided by 144 $k*2^{-\mu}$ samples or time units and the half-subframe first cyclic prefix may be provided by $144 \ k*+2^{-\mu}+16 \ k$ samples or time units with k=64, as described in 3GPP TS 38.211, Section 5.3.1.

FIG. 4A is a block diagram 400 illustrating transmission of a signal based at least on repeated symbols and a longer (modified) cyclic prefix, according to an example implementation.

In an example implementation, FIG. 4A may illustrate a transmission from a gNB (or UE) which may include a longer cyclic prefix 410 and repeated symbols 420. In some implementations, for example, the duration of cyclic prefix 410 may be longer in duration than cyclic prefix 310 of FIG. 3A as the duration of cyclic prefix 410 may be based on the total duration (e.g., summation) of all the cyclic prefixes based on the repetition factor. The repetition factor may be determined based on transmission and time numerologies, for example, $2^{(\mu-\mu_t)}$.

The example implementation illustrated in FIG. 4A has one long (e.g., longer or modified) cyclic prefix at the beginning of the symbol repetition. The cyclic prefix may be a signal copied from the end of a symbol. Therefore, the signal may remain cyclic between the repeated symbols. In addition, as the cyclic prefix is 8 times longer (based on a repetition factor of 8 based on values of 6 and 3 for $\mu$-$\mu_t$, respectively, in the example implementation shown in FIG. 4A, the receiver, e.g., UE (or gNB) may tolerate longer channel delay spread than the cyclic prefixes shown in FIG. 3B.

FIG. 4B is a block diagram 430 illustrating receiving of a signal that is transmitted based at least on repeated symbols and a longer (modified) cyclic prefix, according to an example implementation.

In an example implementation, FIG. 4B may illustrate receiving a signal by a UE (or gNB) which may include repeated symbols 440 in which the FFT windows are aligned with the symbol boundaries of the repeated symbols, to leverage the full benefits of the longer (modified) cyclic prefix. For example, it may be assumed that the radio channel does not change during the repeated symbols and that the signal content is the same for each repeated symbol. Based on these assumptions, inclusion of the long cyclic prefix at the beginning of repeated symbols may be enough to ensure that the signal remains cyclic (as the cyclic prefix repeats at the end of each symbol) and the linear convolution of a frequency-selective multipath channel may be modeled as circular convolution.

FIG. 4C is a block diagram 460 illustrating FFT window timing and cyclic discontinuations on proposed repetition of CP-OFDM symbol, according to an additional example implementation.

In some implementations, for example, the FFT window timing of up-scaled NR slot may be maintained. The fixed FFT window timing may simplify, for example, gNB implementation, when the gNB is detecting NR slots (without repetition) either before or after the proposed transmission. The signal may be detected in such implementations even if the duration of the modified cyclic prefix is not utilized and some non-cyclic signal from previous transmission leaks to the first FFT window as shown at 480 of FIG. 4C. However, the received signal remains cyclic in the following FFT windows. In addition, the FFT windows may not be aligned with the symbol boundaries of the repeated OFDM symbol. However, as the offset is known and the received signal within the FFT window is cyclic, this can be compensated, for example, by corresponding phase rotation of sub-carriers at FFT output.

Figure 5:
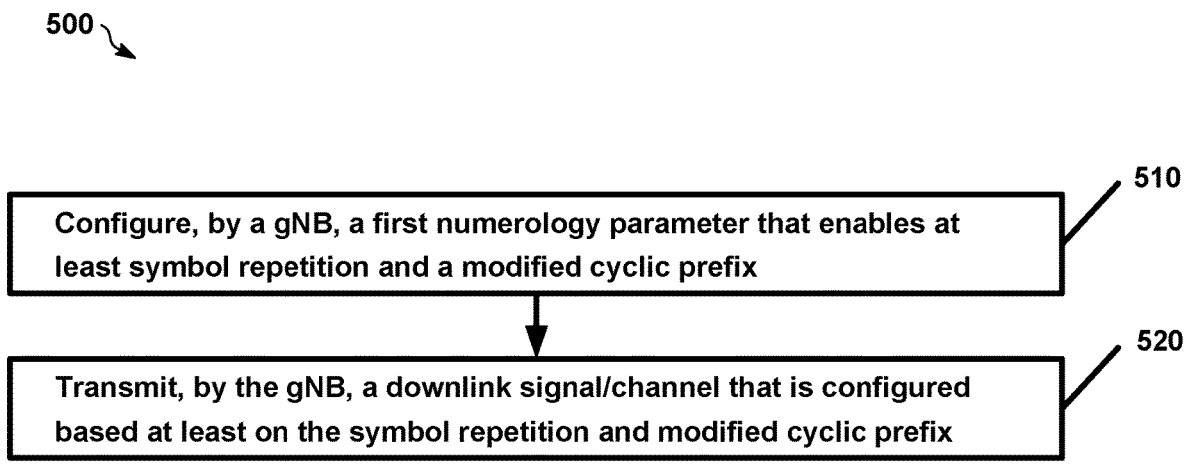
FIG. 5 is a flow chart illustrating cell edge scheduling arrangements for high subcarrier spacings, according to at least one example implementation.

FIG. 5 is a flow chart 500 illustrating cell edge scheduling arrangements for high subcarrier spacings, according to at least one example implementation.

At block 510, a gNB (e.g., 134 of FIG. 1) may configure a first numerology parameter, e.g., time numerology parameter, for at least a UE (e.g., 131 of FIG. 1). In some implementations, for example, the UE may be a cell edge UE and the time numerology parameter may enable symbol repetition and longer (modified) cyclic prefixes. In some implementations, for example, the gNB may determine the time numerology parameter and transmit the first/time numerology parameter in a synchronization signal block (SSB). In some implementations, for example, the gNB may determine the time numerology parameter based at least on uplink signal or channel measurements or signal strength/quality reports received from the UE. For example, if signal quality or strength drops too low (e.g., satisfies a corresponding threshold value) or channel delay is too long (e.g., satisfies a corresponding threshold value), the gNB may configure time numerology parameter for a UE to enable symbol repetition and longer cyclic prefix. In other words, the gNB may determine whether the performed measurements satisfy a condition (e.g., a threshold) and may configure the time numerology parameter accordingly.

In some implementations, the time numerology parameter may be configured with a value that is lower than a second numerology parameter, for example, a transmission numerology parameter. In an example implementation, as described in reference to FIGS. 4A-4C, the time numerology parameter may be set to a value of 3 and the transmission numerology parameter may be set to a value of 6. In addition, in some implementations, a repetition factor used for symbol repetition may be based on the transmission and time numerologies. In an example, implementation, the repetition factor may be determined as 8 based on the formula $((2^{\mu-\mu_t}))$ as described earlier.

In some implementations, the time numerology may be configured for only control channels, e.g., PDCCH, etc. For example, a single PDCCH may serve a plurality of UEs and there is no need to transmit multiple PDCCHs to the UEs. This may result in reduced control signalling overhead. This may also allow for a control channel, e.g., PDCCH, to be transmitted on a wider beam than a shared channel, e.g., PDSCH, so that a single PDCCH transmission may reach/serve a larger number of UEs. In addition, due to the wider beam, the beam gain may be reduced resulting in lower received signal-to-noise (SNR) ratio, and the wider beam may also result in increase in effective channel delay spread. These may be compensated with the configuration of the time numerology parameter which may cause symbol repetition and longer cyclic prefix, while using the same subcarrier spacing for both control and shared channels (e.g., PDCCH and PDSCH).

In some implementations, for example, the time numerology parameter may be configured separately for downlink channels (e.g., PDCCH, PDSCH, etc.) and uplink channels (e.g., PUCCH, PUSCH, etc.). In an example implementation, when the time numerology parameter is configured separately for downlink and uplink channels, timing parameters (e.g., K0, K1, K2, etc.) may follow rules already defined for 5G/NR for mixed numerologies across carriers, and for signals on the same carrier in the implementations being described in the present disclosure.

The time numerology parameter may be configured for channels or transmissions that require very high reliability, e.g., ultra-reliable low-latency communications (URLLC) or radio resource control (RRC) messages. The symbol repetitions may help in meeting higher reliability requirements. In addition, in some implementations, the signal (same signal) may be transmitted from a plurality of non-collocated transmission reception points to achieve transmission diversity (and to improve reliability).

In some implementations, the time numerology parameter may be configured for a channel using unique word (UW) single carrier-frequency division multiple access (SC-FDMA) waveform to provide, for example, low peak-to-average power ratio (PAPR) and favorable adjacent channel leakage ratio (ACLR). The longer cyclic prefix may provide sufficient gap for UW sequence insertion without causing excessive overhead.

At block 520, the gNB may transmit a downlink signal/channel that is configured based at least on the symbol repetition and modified cyclic prefix, for example, to one or more UEs. In some implementations, for example, the gNB may transmit repeated symbols with a long cyclic prefix. In some implementations, for example, the long cyclic prefix refers to the duration of the cyclic prefix (e.g., 410 of FIG. 4A) which is longer in duration than cyclic prefix of 310 of FIG. 3A. The symbols may be repeated based on the repetition factor and the duration of the modified cyclic prefix may be equal to the sum of the duration of the cyclic prefixes, as described earlier. In other words, the total duration (e.g., first total duration) of the modified cyclic prefix (which may be determined based on time numerology) and repeated symbols based on time numerology $\mu_t$ may be equal to the total duration (e.g., second total duration) of the cyclic prefixes and repeated symbols based on transmission numerology $\mu$.

In addition, in some implementations, for example, the gNB may transmit a plurality of signals simultaneously which may be configured with same transmission and time numerologies. However, as slot & symbol timings between different numerologies are maintained, $\mu/\mu_t$ parameter pair may be chosen freely for consecutive transmissions. For example, the gNB may transmit to cell edge UE(s) at a first time instant and may transmit to cell center UEs (without repetition) at second time instant. In addition, depending on gNB capabilities, signals having different timings may be multiplexed within a symbol. This may require proper isolation between the signals, which may be obtained, for example, by frequency division multiplexing (FDM) (e.g., guard band) and/or space division multiplexing (SDM).

Although FIG. 5 is described in the context of a gNB, it applies to UE as well. In other words, a UE transmitting a signal/channel that is configured based at least on time configuration (e.g., symbol repetition and modified cyclic prefix) received from the gNB.

Figure 6:
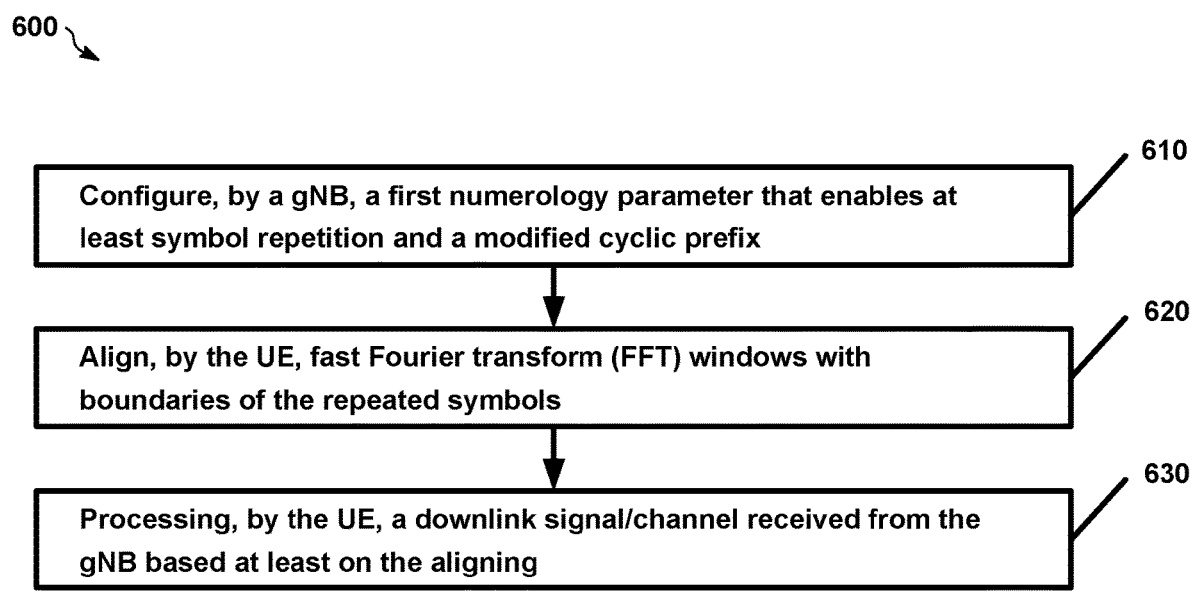
FIG. 6 is a flow chart illustrating cell edge scheduling arrangements for high subcarrier spacings, according to at least an additional example implementation.

FIG. 6 is a flow chart 600 illustrating cell edge scheduling arrangements for high subcarrier spacings, according to at least an additional example implementation.

At block 610, a UE (e.g., 131 of FIG. 1) may configure a time numerology parameter that enables at least symbol repetition and modified cyclic prefix based at least on information received from a gNB. In some implementations, for example, as described earlier, the configuration of the time numerology parameter may be based at least on the information (e.g., time numerology parameter) received from the gNB.

At block 620, the UE may align fast Fourier transform (FFT) windows with boundaries of the repeated symbols, as described in detail in reference to FIG. 4B.

At block 630, the UE may process a downlink signal/channel received from the gNB based at least on the aligning.

Although FIG. 6 is described in the context of a UE, it applies to a gNB as well. In other words, a gNB receiving a signal/channel that is configured based at least on time configuration (e.g., symbol repetition and modified cyclic prefix).

Thus, the above described example implementations provide several benefits/advantages which include, for example, increased cyclic prefix duration without increasing cyclic prefix overhead, maintaining of symbol alignment with NR subframe structure, maintaining of cell coverage comparable to lower time-frequency numerology by using symbol repetition while supporting wide channel bandwidths with reasonable FFT sizes, scheduling cell edge UEs requiring coverage enhancements and other UEs (e.g., cell center UEs) without any need for symbol repetition at consecutive time instances, supporting allocation granularities, with minor changes to the Specifications.

Additional example implementations are described herein.

Example 1. A method of communications, comprising: configuring, by a gNB, a first numerology parameter that enables at least symbol repetition and a modified cyclic prefix; and transmitting, by the gNB, a downlink signal/channel that is configured based at least on the symbol repetition and modified cyclic prefix.

Example 2. The method of Example 1, wherein the first numerology parameter is configured such that the first numerology parameter is lower in value than a second numerology parameter, and wherein the first numerology parameter is a time numerology parameter and the second numerology parameter is a transmission numerology parameter.

Example 3. The method of any of Examples 1-2, further comprising: performing, by the gNB, measurements of a signal/channel received from a user equipment (UE); and determining, by the gNB, whether the signal/channel measurements satisfy a condition, wherein the configuring of the first numerology parameter is based on the condition being satisfied.

Example 4. The method of any of Examples 1-3, wherein the first numerology parameter indicates one or more of cyclic prefix length, cyclic prefix timing, symbol timing, slot numbering, and timing of assignment.

Example 5. The method of any of Examples 1-4, wherein the second numerology parameter indicates subcarrier spacing configuration, and wherein the subcarrier spacing configuration includes one or more of subcarrier spacing, fast Fourier transform (FFT) time duration, inverse fast Fourier transform (IFFT) time duration, symbol time duration, sample rate, and timing advance.

Example 6. The method of any of Examples 1-5, further comprising: determining a repetition factor, the repetition factor being determined based at least on the first and second numerology parameters, and wherein the symbol repetition is based at least on the repetition factor.

Example 7. The method of any of Examples 1-6, wherein a first total duration of the modified cyclic prefix and repeated symbols based on the first numerology parameter is equal to a second total duration of the cyclic prefixes and repeated symbols based on the second numerology parameter.

Example 8. The method of any of Examples 1-7, wherein the modified cyclic prefix is located at a start of the symbol repetition.

Example 9. The method of any of Examples 1-8, wherein the first numerology parameter is configured for control channels and/or shared channels.

Example 10. The method of any of Examples 1-9, wherein the first numerology parameter is configured separately for downlink and uplink channels.

Example 11. The method of any of Examples 1-10, wherein the first numerology parameter is configured for a channel using unique word (UW) single carrier-frequency division multiple access (SC-FDMA) waveform.

Example 12. The method of any of Examples 1-11, wherein the channel is an uplink channel.

Example 13. The method of any of Examples 1-12, wherein the downlink signal/channel is transmitted from a plurality of non-collocated transmission reception points for transmission diversity.

Example 14. An apparatus comprising at least one processor and at least one memory including computer instructions, when executed by the at least one processor, cause the apparatus to perform a method of any of Examples 1-13.

Example 15. An apparatus comprising means for performing a method of any of Examples 1-13.

Example 16. A non-transitory computer-readable storage medium having stored thereon computer executable program code which, when executed on a computer system, causes the computer system to perform the steps of any of Examples 1-13.

Example 17. A method of communications, comprising: configuring, by a user equipment (UE), a first numerology parameter that enables at least symbol repetition and modified cyclic prefix based at least on information received from a gNB; aligning, by the UE, fast Fourier transform (FFT) windows with boundaries of the repeated symbols; and processing, by the UE, a downlink signal/channel received from the gNB based at least on the aligning.

Example 18. The method of Example 17, wherein the first numerology parameter is configured such that the first numerology parameter is lower in value than a second numerology parameter, and wherein the first numerology parameter is a time numerology parameter and the second numerology parameter is a transmission numerology parameter.

Example 19. The method of any of Examples 17-18, wherein the first numerology parameter indicates one or more of cyclic prefix length, cyclic prefix timing, symbol timing, slot numbering, and timing of assignment.

Example 20. The method of any of Examples 17-19, wherein the second numerology parameter indicates subcarrier spacing configuration, and wherein the subcarrier spacing configuration includes one or more of subcarrier spacing, fast Fourier transform (FFT) time duration, inverse fast Fourier transform (IFFT) time duration, symbol time duration, sample rate, and timing advance.

Example 21. The method of any of Examples 17-20, further comprising: determining a repetition factor, the repetition factor being determined based at least on the first and second numerology parameters, wherein the symbol repetition is based at least on the repetition factor.

Example 22. The method of any of Examples 17-21, wherein a first total duration of the modified cyclic prefix and repeated symbols based on the first numerology parameter is equal to a second total duration of the cyclic prefixes and repeated symbols based on the second numerology parameter.

Example 23. The method of any of Examples 17-22, wherein the modified cyclic prefix is located at a start of the symbol repetition.

Example 24. The method of any of Examples 17-23, wherein the first numerology parameter is configured for control channels and/or shared channels.

Example 25. The method of any of Examples 17-24, wherein the first numerology parameter is configured for an uplink channel using unique word (UW) single carrier-frequency division multiple access (SC-FDMA) waveform.

Example 26. An apparatus comprising at least one processor and at least one memory including computer instructions, when executed by the at least one processor, cause the apparatus to perform a method of any of Examples 17-25.

Example 27. An apparatus comprising means for performing a method of any of Examples 17-25.

Example 28. A non-transitory computer-readable storage medium having stored thereon computer executable program code which, when executed on a computer system, causes the computer system to perform the steps of any of Examples 17-25.

Example 29. A method of communications, comprising: receiving, by a user equipment (UE), a first numerology parameter that enables at least symbol repetition and a modified cyclic prefix; and transmitting, by the UE, an uplink signal/channel based at least on the symbol repetition and modified cyclic prefix.

Example 30. The method of Example 29, wherein the first numerology parameter is configured such that the first numerology parameter is lower in value than a second numerology parameter, and wherein the first numerology parameter is a time numerology parameter and the second numerology parameter is a transmission numerology parameter.

Example 31. The method of any of Examples 29-30, wherein a first total duration of the modified cyclic prefix and repeated symbols based on the first numerology parameter is equal to a second total duration of the cyclic prefixes and repeated symbols based on the second numerology parameter.

Example 32. The method of any of Examples 29-31, wherein the modified cyclic prefix is located at a start of the symbol repetition.

Example 33. The method of any of Examples 29-32, wherein the time numerology parameter is configured for control channels and/or shared channels.

Example 34. The method of any of Examples 29-33, wherein the time numerology parameter is configured separately for downlink and uplink channels.

Example 35. The method of any of Examples 29-34, wherein the time numerology parameter is configured for a channel using unique word (UW) single carrier-frequency division multiple access (SC-FDMA) waveform.

Example 36. The method of any of Examples 29-35, wherein the channel is an uplink channel.

Example 37. An apparatus comprising at least one processor and at least one memory including computer instructions, when executed by the at least one processor, cause the apparatus to perform a method of any of Examples 29-36.

Example 38. An apparatus comprising means for performing a method of any of Examples 29-36.

Example 39. A non-transitory computer-readable storage medium having stored thereon computer executable program code which, when executed on a computer system, causes the computer system to perform the steps of any of Examples 29-36.

Example 40. A method of communications, comprising: configuring, by a gNB, a first numerology parameter that enables at least symbol repetition and a modified cyclic prefix; aligning, by the gNB, fast Fourier transform (FFT) windows with boundaries of the repeated symbols; and processing, by the gNB, an uplink signal/channel received from a user equipment (UE) based at least on the aligning.

Example 41. The method of Example 40, wherein the first numerology parameter is configured such that the first numerology parameter is lower in value than a second numerology parameter, and wherein the first numerology parameter is a time numerology parameter and the second numerology parameter is a transmission numerology parameter.

Figure 7:
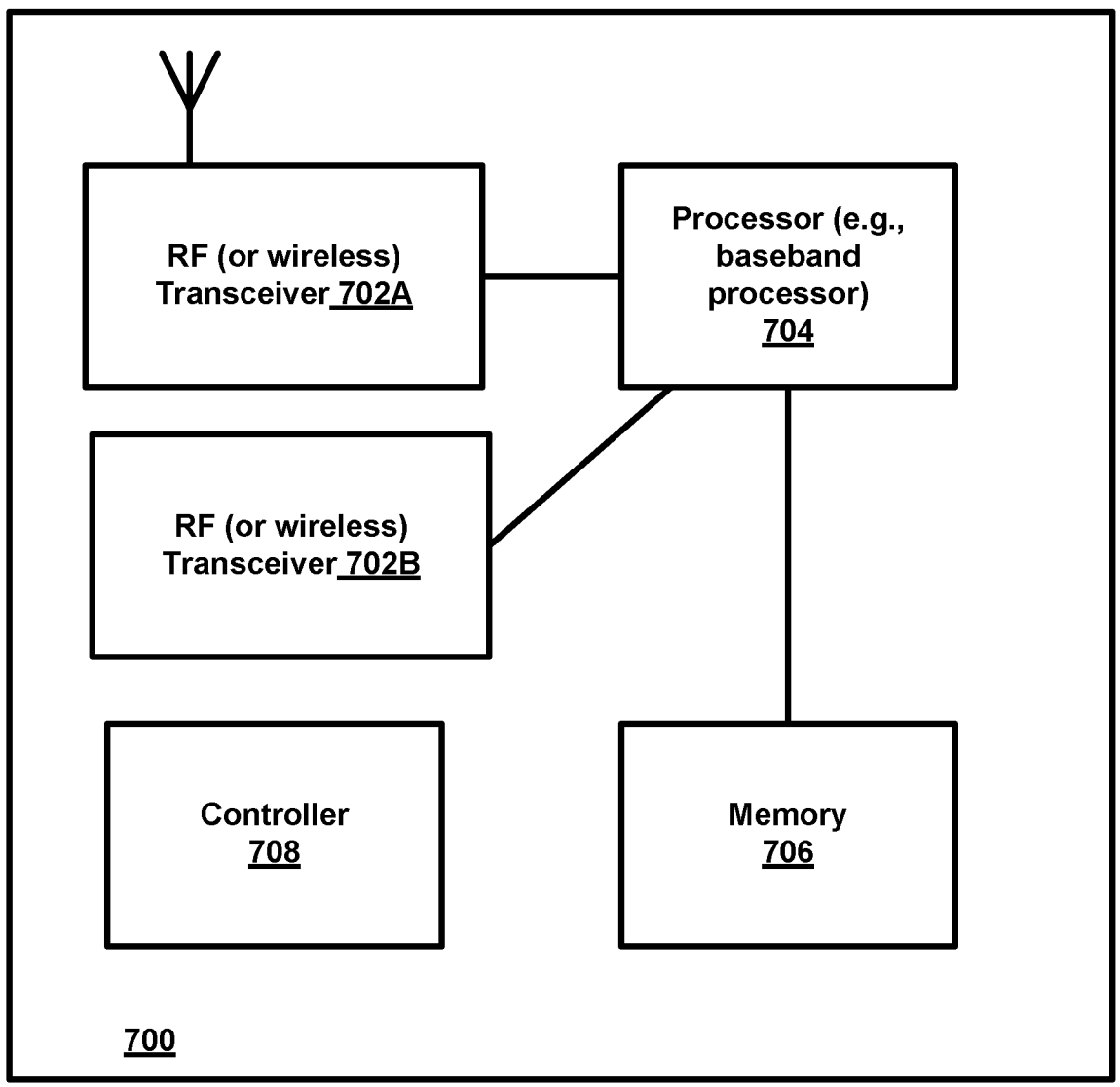
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB/MgNB/SgNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/708 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
    performing, by a gNB, measurements of a signal/channel received from a user equipment (UE);
    determining, by the gNB, the signal/channel measurements indicate that at least a channel delay is too long and exceeds a channel delay threshold;
    determining a first numerology parameter based at least on the signal/channel measurements;
    based on at least the channel delay exceeding the channel delay threshold, configuring, by the gNB, the first numerology parameter for only control channels to enable at least symbol repetition and a modified cyclic prefix while using a same subcarrier spacing for both control and shared channels, wherein the first numerology parameter indicates cyclic prefix length, cyclic prefix timing, symbol timing, slot numbering, and timing of assignment, wherein the first numerology parameter is configured such that the first numerology parameter is set to a value of three and a second numerology parameter is set to a value of six, and the first numerology parameter is a time numerology parameter and the second numerology parameter is a transmission numerology parameter, wherein the second numerology parameter indicates subcarrier spacing configuration that includes subcarrier spacing, fast Fourier transform (FFT) time duration, inverse fast Fourier transform (IFFT) time duration, symbol time duration, sample rate, and timing advance, and wherein the transmission numerology parameter is a scaling factor which defines scaling for different numerologies;
    determining a repetition factor of eight, the repetition factor being determined based at least on the first and second numerology parameters, and wherein the symbol repetition is based at least on the repetition factor; and
    transmitting, by the gNB, a downlink signal/channel that is configured based at least on the symbol repetition and the modified cyclic prefix comprising a duration that is longer than a standard cyclic prefix and wherein the modified cyclic prefix is based on a summation of all cyclic prefixes.

2. The method of claim 1, wherein a first total duration of the modified cyclic prefix and repeated symbols based on the first numerology parameter is equal to a second total duration of the cyclic prefixes and repeated symbols based on the second numerology parameter.

3. The method of claim 2, wherein the modified cyclic prefix is located at a start of the symbol repetition.

4. The method of claim 3, wherein the first numerology parameter is configured for control channels and shared channels.

5. The method of claim 4, wherein the first numerology parameter is configured separately for downlink and uplink channels.

6. The method of claim 5, wherein the first numerology parameter is configured for a channel using unique word (UW) single carrier-frequency division multiple access (SC-FDMA) waveform.

7. The method of claim 6, wherein the channel is an uplink channel.

8. The method of of claim 7, wherein the downlink signal/channel is transmitted from a plurality of non-collocated transmission reception points for transmission diversity.

9. A method of communications, comprising:
    receiving, by a user equipment (UE) from a gNB, a first numerology parameter based on signal channel measurements received from the UE, the signal/channel measurements indicating that at least a channel delay is too long and exceeds a channel delay threshold;
    based on at least the channel delay exceeding the channel delay threshold, configuring, by the UE, the first numerology parameter for only control channels to enable at least symbol repetition and a modified cyclic prefix while using a same subcarrier spacing for both control and shared channels, wherein the first numerology parameter indicates cyclic prefix length, cyclic prefix timing, symbol timing, slot numbering, and timing of assignment, wherein the first numerology parameter is configured such that the first numerology parameter is set to a value of three and a second numerology parameter is set to a value of six, and the first numerology parameter is a time numerology parameter and the second numerology parameter is a transmission numerology parameter, wherein the second numerology parameter indicates subcarrier spacing configuration that includes subcarrier spacing, fast Fourier transform (FFT) time duration, inverse fast Fourier transform (IFFT) time duration, symbol time duration, sample rate, and timing advance, and wherein the transmission numerology parameter is a scaling factor which defines scaling for different numerologies;
    determining a repetition factor of eight, the repetition factor being determined based at least on the first and second numerology parameters, and wherein the symbol repetition is based at least on the repetition factor; and
    transmitting, by the UE, an uplink signal/channel based at least on the symbol repetition and the modified cyclic prefix comprising a duration that is longer than a standard cyclic prefix and wherein the modified cyclic prefix is based on a summation of all cyclic prefixes.

10. The method of claim 9, wherein a first total duration of the modified cyclic prefix and repeated symbols based on the first numerology parameter is equal to a second total duration of the cyclic prefixes and repeated symbols based on the second numerology parameter.

11. The method of claim 10, wherein the modified cyclic prefix is located at a start of the symbol repetition.

12. The method of claim 9, wherein the first numerology parameter is configured for control channels and/or shared channels.

13. The method of claim 9, wherein the first numerology parameter is configured separately for downlink and uplink channels.

14. The method of claim 9, wherein the first numerology parameter is configured for a channel using unique word (UW) single carrier-frequency division multiple access (SC-FDMA) waveform.

15. The method of claim 14, wherein the channel is an uplink channel.

16. A user equipment (UE) comprising at least one processor and at least one memory including computer instructions, when executed by the at least one processor, cause the UE to perform:

receiving, from a gNB, a first numerology parameter based on signal channel measurements received from the UE, the signal/channel measurements indicating that at least a channel delay is too long and exceeds a channel delay threshold;

based on at least the channel delay exceeding the channel delay threshold, configuring the first numerology parameter for only control channels to enable at least symbol repetition and a modified cyclic prefix while using a same subcarrier spacing for both control and shared channels, wherein the first numerology parameter indicates cyclic prefix length, cyclic prefix timing, symbol timing, slot numbering, and timing of assignment, wherein the first numerology parameter is configured such that the first numerology parameter is set to a value of three and a second numerology parameter is set to a value of six, and the first numerology parameter is a time numerology parameter and the second numerology parameter is a transmission numerology parameter, wherein the second numerology parameter indicates subcarrier spacing configuration that includes subcarrier spacing, fast Fourier transform (FFT) time duration, inverse fast Fourier transform (IFFT) time duration, symbol time duration, sample rate, and timing advance, and wherein the transmission numerology parameter is a scaling factor which defines scaling for different numerologies;

determining a repetition factor of eight, the repetition factor being determined based at least on the first and second numerology parameters, and wherein the symbol repetition is based at least on the repetition factor; and transmitting an uplink signal/channel based at least on the symbol repetition and the modified cyclic prefix comprising a duration that is longer than a standard cyclic prefix and wherein the modified cyclic prefix is based on a summation of all cyclic prefixes.

* * * * *